United States Patent
Takada et al.

(10) Patent No.: US 6,181,753 B1
(45) Date of Patent: Jan. 30, 2001

(54) ECHO/NOISE CANCELER WITH DELAY COMPENSATION

(75) Inventors: Masashi Takada; Yoshihiro Ariyama, both of Tokyo (JP)

(73) Assignee: Oki Electric Industry Co., Ltd., Tokyo (JP)

(*) Notice: Under 35 U.S.C. 154(b), the term of this patent shall be extended for 0 days.

(21) Appl. No.: 09/055,319

(22) Filed: Apr. 6, 1998

(30) Foreign Application Priority Data

Apr. 30, 1997 (JP) ................................................ 9-112248

(51) Int. Cl.[7] .............................. H03D 1/04; H04B 3/20; H04M 9/08; H03B 29/00
(52) U.S. Cl. .......................... 375/346; 370/286; 379/410; 381/71.1
(58) Field of Search ..................................... 375/346, 316; 370/289, 286, 290; 379/406, 410–411, 402; 381/71.1, 71.12, 94.1, 94.2, 94.8, 94.9

(56) References Cited

U.S. PATENT DOCUMENTS

| | | | |
|---|---|---|---|
| 5,315,585 | * | 5/1994 | Iizuka et al. .......................... 370/289 |
| 5,631,899 | * | 5/1997 | Duttweiler .............................. 370/291 |
| 5,638,311 | * | 6/1997 | Fujii et al. ............................. 708/322 |
| 5,663,955 | * | 9/1997 | Iyengar ................................. 370/291 |
| 5,796,819 | * | 8/1998 | Romesburg ........................... 379/406 |
| 5,859,907 | * | 1/1999 | Kawahara et al. .................... 379/410 |
| 5,937,060 | * | 8/1999 | Oh ......................................... 379/406 |

FOREIGN PATENT DOCUMENTS 8-8789   1/1996 (JP) .

* cited by examiner

Primary Examiner—Chi H. Pham
Assistant Examiner—Khai Tran
(74) Attorney, Agent, or Firm—Venable; Robert J. Frank; Michael A. Sartori

(57) ABSTRACT

An echo/noise canceler has an adaptive filter with coefficients that are applied to recent samples of a received signal to generate an echo replica. The echo replica is subtracted from a local input signal to create a first residual signal, and local background noise is canceled from the first residual signal to create a second residual signal. The echo/noise canceler also stores older samples of the received signal, and uses these older samples and the second residual signal to adjust the coefficients in the adaptive filter. The delay between the recent samples and the older samples compensates for the noise cancellation processing delay between the first residual signal and the second residual signal.

8 Claims, 5 Drawing Sheets

ECHO/NOISE CANCELER WITH DELAY COMPENSATION

BACKGROUND OF THE INVENTION

The present invention relates to an echo/noise canceler for removing echo and noise components from an input signal.

Echo cancelers and noise cancelers are used in voice communication terminals such as videoconferencing terminals, automobile-mounted hands-free telephone sets, and portable telephone sets. Unexamined Japanese Patent Application No. 8789/1996 describes a voice communication system in which a noise canceler removes noise components from the output of an echo canceler, and the output of the noise canceler is used in adjusting adaptive filter coefficients in the echo canceler. The reason for this arrangement is that use of the output of the noise canceler in adjusting the adaptive filter coefficients enables the residual echo to be reduced to a lower level. In a variation of this arrangement, the output of the echo canceler, which is the input of the noise canceler, is used to adjust the adaptive filter coefficients until the residual echo has been reduced to the local background noise level, then the output of the noise canceler is used to achieve a further reduction.

A problem in this arrangement is the processing delay of the noise canceler. Most recent noise cancelers divide the input signal into frames and process one frame at a time. Noise cancelers employing spectral subtraction, for example, operate in this way. Spectral subtraction and other frame-based noise cancellation methods have the advantage of high accuracy, but they generate an unavoidable processing delay equal to or greater than the frame length.

In the arrangement described above, a long processing delay in the noise canceler can prevent the adaptive filter coefficients in the echo canceler from converging, or can cause the coefficient values to oscillate. Further details will be given below.

SUMMARY OF THE INVENTION

It is accordingly an object of the present invention to provide an echo/noise canceler that compensates for the processing delay in the noise canceler.

Another object of the invention is to achieve a high level of echo reduction.

Yet another object is to save power.

The invented echo/noise canceler comprises an echo canceler and a noise canceler. The echo canceler has an adaptive filter that uses a plurality of coefficients to generate an echo replica from a plurality of recent sample values of a received signal. The echo replica is subtracted from a local input signal to cancel an echo of the received signal, generating a first residual signal. The noise canceler cancels local background noise in the first residual signal, generating a second residual signal having a certain processing delay with respect to the first residual signal.

The adaptive filter has a sample register that stores the above-mentioned recent sample values of the received signal, a delayed sample register that stores a plurality of older sample values of the received signal, and a coefficient adjuster that adjusts the above-mentioned coefficients on the basis of the older sample values and the second residual signal.

The echo canceler preferably has a detector that, when the level of local background noise is low, switches off the noise canceler and causes the coefficient adjuster to use the first residual signal and the recent sample values in adjusting the coefficients.

The delay between the sample values stored in the sample register and the sample values stored in the delayed sample register compensates for the processing delay of the noise canceler, so that the coefficient adjustment is carried out consistently. Use of the second residual signal then leads to a high level of echo reduction.

Switching off the noise canceler when the local background noise level is low saves power.

DETAILED DESCRIPTION OF THE INVENTION

Embodiments of the invention will be described with reference to the attached example drawings.

Figure 1:
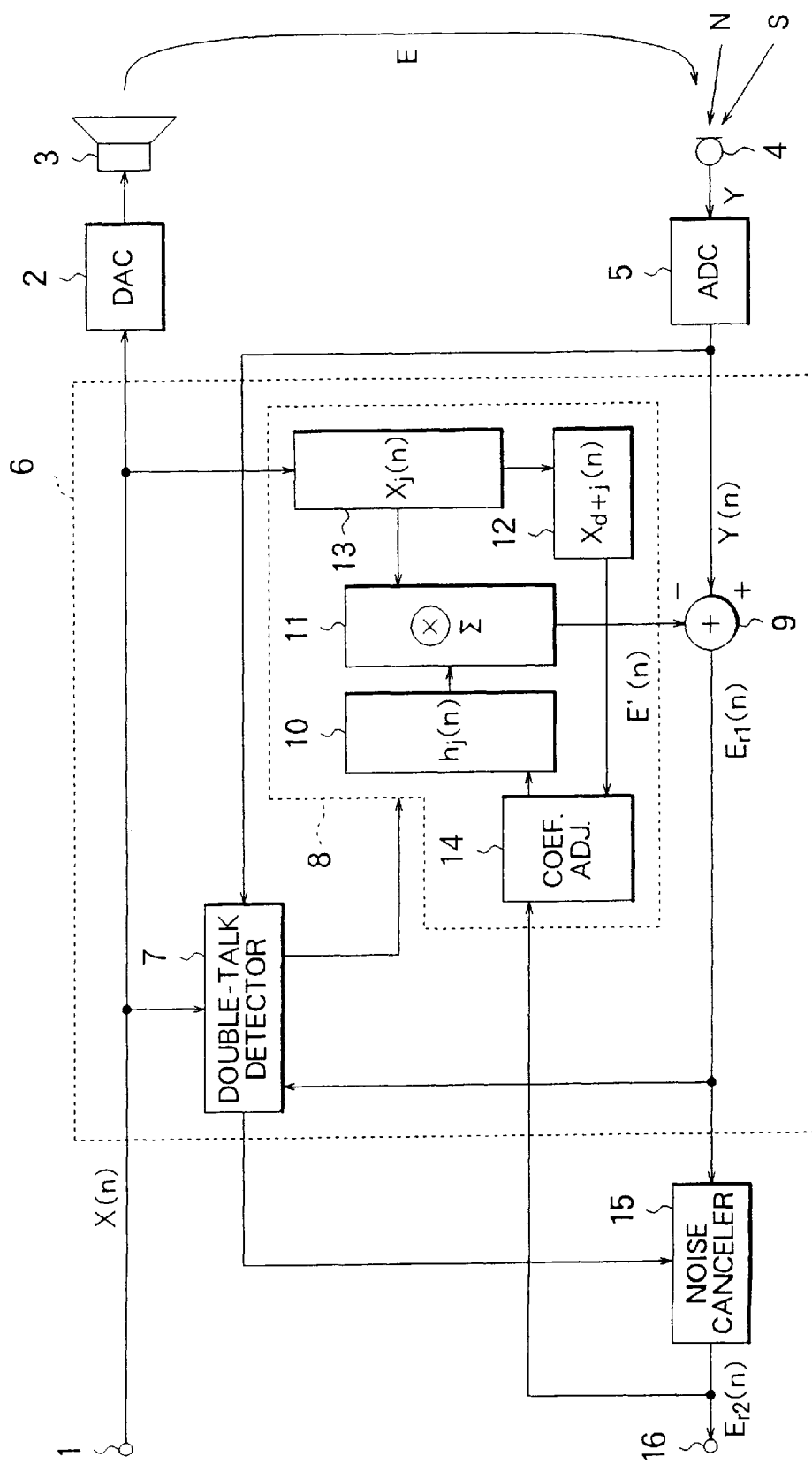
FIG. 1 is a block diagram of a first embodiment of the invention.

Referring to FIG. 1, the first embodiment is an echo/noise canceler operating in a communication device having an input terminal 1 that receives a digital signal X(n) from a distant communication device, a digital-to-analog converter (DAC) 2 that converts the received signal to an analog signal, and a loudspeaker 3 through which the analog signal is reproduced as an acoustic signal. Part of the reproduced signal is picked up as an acoustic echo E by a microphone 4, which also picks up local background noise N and speech S. An analog-to-digital converter (ADC) 5 converts the microphone output signal Y to a digitized local input signal Y(n), which is supplied to an echo canceler 6.

The letter 'n' is a discrete time variable indicating that, for example, Y(n) is the n-th sample of Y. The sampling frequency is, for example, eight kilohertz (8 kHz) for all of the digital signals shown in the drawing.

The echo canceler 6 comprises a double-talk detector 7, an adaptive filter 8, and an adder 9. The adaptive filter 8 comprises a coefficient register 10, an arithmetic circuit 11, a novel delayed sample register 12, a sample register 13, and a coefficient adjuster (COEF. ADJ.) 14. The output of the echo canceler 6 is a first residual signal $Er_1(n)$ in which the components due to the echo (E) have been attenuated.

The first residual signal $Er_1(n)$ is supplied to a noise canceler 15, which attenuates components due to the local background noise (N), thereby creating a second residual signal $Er_2(n)$. The second residual signal $Er_2(n)$ is supplied to an output terminal 16 and returned to the distant communication device.

Figure 2:
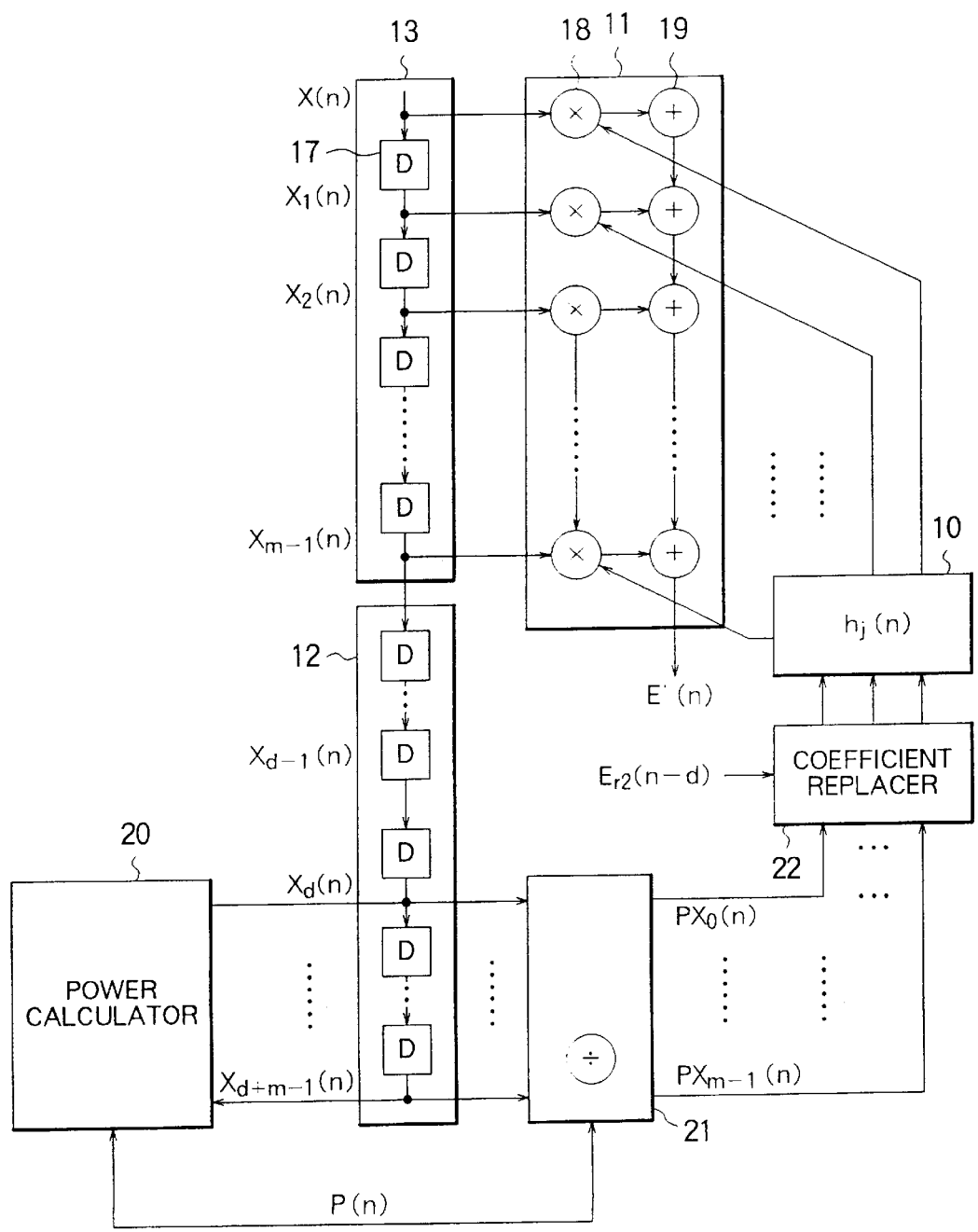
FIG. 2 is a more detailed block diagram of the adaptive filter in FIG. 1.

FIG. 2 shows the structure of the adaptive filter 8 in more detail.

The coefficient register 10 stores m tap coefficients, where m is a certain positive integer. The tap coefficients stored at time n are denoted $h_j(n)$, where j is an integer that varies from zero to m−1.

The delayed sample register 12 and sample register 13 together form a shift register comprising D-type flip-flops 17 that delay the received signal X(n) by one sample at a time.

The number of D-type flip-flops 17 is d+m−1, where d is a positive integer equivalent to the processing delay of the noise canceler 15. In the drawing, the processing delay d is greater than number of tap coefficients m. The first (m−1) D-type flip-flops 17 constitute the sample register 13; the remaining D-type flip-flops 17 constitute the delayed sample register 12.

The output $X_1(n)$ of the first D-type flip-flop 17 is equal to $X(n-1)$. The output $X_2(n)$ of the next D-type flip-flop is equal to $X(n-2)$, and so on. The received signal $X(n)$ will also be denoted $X_0(n)$.

The arithmetic circuit 11 comprises m multipliers 18 that multiply the sample values $X_j(n)$ stored in the sample register 13 by the tap coefficients $h_j(n)$ stored in the coefficient register 10, and m adders 19 that sum the resulting products to generate an echo replica $E'(n)$.

The coefficient adjuster 14 comprises a power calculator 20, a divider 21, and a coefficient replacer 22.

Next, the operation of the first embodiment will be described.

Referring again to FIG. 1, the output $Y(n)$ of the ADC 5 includes a component $E(n)$ due to the echo E, a component $N(n)$ due to the local background noise N, and when the local party is speaking, a component $S(n)$ due to the local party's speech S.

$$Y(n)=S(n)+E(n)+N(n)$$

From the m most recent samples of the received signal $X(n)$, the adaptive filter 8 predicts the echo component $E(n)$ and generates an echo replica $E'(n)$ according to the following equation.

$$E'(n) = \sum_{j=0}^{m-1} X_j(n)h_j(n)$$

When the tap coefficients $h_j(n)$ are properly adjusted, the echo replica $E'(n)$ is substantially equal to the echo component $E(n)$. The adder 9 adds the two's complement of the echo replica $E'(n)$ to the output $Y(n)$ of the ADC 5, thereby subtracting $E'(n)$ from $Y(n)$, to obtain the first residual signal $Er_1(n)$.

$$Er_1(n)=Y(n)-E'(n)=S(n)+E(n)+N(n)-E'(n)\equiv S(n)+N(n)$$

The noise canceler 15 uses a frame-based method to estimate the noise component $N(n)$, and subtracts the estimated noise component $N'(n)$ from the first residual signal $Er_1(n)$ to obtain the second residual signal $Er_2(n)$. Examples of noise cancellation methods that can be used in the noise canceler 15 include, in addition to spectral subtraction, methods employing filter banks or adaptive filters. Detailed descriptions of these methods will be omitted. The noise canceler 15 can use any frame-based method, regardless of the length of the processing delay d.

The processing delay of the noise canceler 15 can be represented as a mathematical operator $Zd\{\ \}$ that subtracts the quantity d from the discrete time variable n of the components inside the braces. It is also convenient to indicate the delay by using $Er_2(n-d)$ to denote the output of the noise canceler 15 at the time when $Er_1(n)$ is received as input. Thus, $$Er_2(n-d)=Zd\{S(n)+N(n)-N'(n)\}\equiv S(n-d)$$

The distant party accordingly receives the speech component with a delay equal to d, but with negligible contamination by echo and noise.

The double-talk detector 7 receives the received signal $X(n)$, the digitized local input signal $Y(n)$, and the first residual signal $Er_1(n)$. The double-talk detector 7 computes an acoustic muting factor ACOM equal, for example, to the power ratio between the received signal $X(n)$ and the first residual signal $Er_1(n)$. The double-talk detector 7 compares ACOM with a predetermined threshold THd, compares the power of $Er_1(n)$ with another predetermined threshold THi, compares the power of $X(n)$ with another predetermined threshold THst, and compares the power of the local input signal $Y(n)$ with yet another predetermined threshold Dy. On the basis of these comparisons, the double-talk detector 7 determines when and how to adjust the tap coefficients in the adaptive filter 8, and the coefficients used in the noise canceler 15.

Double-talk refers to a state in which the distant party and the local party are both talking at once. This state is detected when ACOM is less than the threshold THd, and the power of $Y(n)$ exceeds the threshold Dy. In the double-talk state, the double-talk detector 7 sends commands to the adaptive filter 8 and noise canceler 15 that halt the adjustment of coefficients. Echo cancellation and noise cancellation continue, using the existing coefficient values.

When the power of $Er_1(n)$ is greater than the threshold THi and the power of $Y(n)$ is less than the threshold Dy, a situation that occurs when the echo path has infinite loss, the double-talk detector 7 sends the adaptive filter 8 a command that forces the tap coefficients to converge toward zero, and sends the noise canceler 15 a command that clears the coefficients in the noise canceler 15 to zero. The purpose of these actions is to avoid the introduction of false background noise and false echo into the residual signals. The echo path from the loudspeaker 3 to the microphone 4 is temporarily regarded as non-existent.

When ACOM is greater than the threshold THd and the power of the received signal $X(n)$ is greater than the threshold THst, a state that occurs when only the distant party is speaking, the double-talk detector 7 commands the adaptive filter 8 and noise canceler 15 to adjust their coefficients. The adaptive filter 8 employs the normalized least mean squares (NLMS) adjustment algorithm, as described later. A description of the algorithm used in the noise canceler 15 will be omitted. This state is referred to as the single-talk state.

When ACOM is less than the threshold THd and the power of $X(n)$ is less than the threshold THst, a state that occurs when only the local party is speaking, the double-talk detector 7 sends commands to the adaptive filter 8 and noise canceler 15 that halt the adjustment of coefficients. Echo cancellation and noise cancellation continue, using the existing coefficient values.

When there is a transition from the double-talk state to the single-talk state, the double-talk detector 7 does not immediately command the noise canceler 15 to begin adjusting its coefficients, but waits for a time equivalent to the processing delay d. The reason is that for the duration of this delay d, the noise canceler 15 continues to process the first residual signal $Er_1(n)$ that was generated during the double-talk state.

When commanded by the double-talk detector 7 to adjust the tap coefficients, the adaptive filter 8 carries out the following operations.

Referring again to FIG. 2, at time n, the delayed sample register 12 holds d samples values from $X_m(n)$ to $X_{d+m-1}(n)$. These sample values have already been used in generating the echo replica signal and are no longer needed for that purpose. The oldest m sample values, from $X_d(n)$ to $X_{d+m-1}(n)$, are provided in parallel to the power calculator 20 and divider 21. The power calculator 20 computes a received power value P(n) by summing the squares of these m sample values. P(n) is thus calculated according to the following equation.

$$P(n) = \sum_{i=d}^{d+m-1} X_i(n)x_i(n)$$

The divider 21 divides each of the m sample values from $X_d(n)$ to $X_{d+m-1}(n)$ by the received power value P(n), thereby normalizing the sample values. At time n, the divider 21 therefore outputs m quotient values $PX_j(n)$, where j varies from 0 to m−1. The value of $PX_j(n)$ is given by the following equation.

$$PX_j(n) = X_i(n)/P(n) \quad (j=i-d)$$

The values $PX_j(n)$ are normalized sample values with an offset of d on the time axis, compensating for the processing delay d of the noise canceler 15. The non-normalized values of these samples were the values used in removing echo from the signal that has become the output $Er_2(n-d)$ of the noise canceler 15 at time n.

The coefficient replacer 22 uses the output $Er_2(n-d)$ of the noise canceler 15 and the normalized sample values $PX_j(n)$ to adjust the tap coefficients $h_j(n)$ by the NLMS algorithm. The adjustment is given by the following equation, in which α is a step gain, preferably greater than zero but less than one.

$$h_j(n+1) = h_j(n) + \alpha PX_j(n)Er_2(n-d)$$

Correct alignment of the $PX_j(n)$ (j=0 to m−1) with $Er_2(n-d)$ can be verified from the observation that $Er_2(n-d)$, $Er_1(n-d)$ and Y(n−d) all have the same speech component S(n−d), that $Er_1(n-d)$ was obtained by subtracting E'(n−d) from Y(n−d), that E'(n−d) was calculated using $X_j(n-d)$ (j=0 to m−1), that the $PX_j(n)$ (j=0 to m−1) are obtained from $X_i(n)$ with j=i−d, hence i=j+d, and that $X_i(n)$ or $X_{j+d}(n)$ and $X_j(n-d)$ are both equal to X(n−j−d). The preceding equations can also be rewritten in the following form.

$$P(n) = \sum_{k=0}^{m-1} X_k(n-d)X_k(n-d)$$

$$PX_j(n) = X_j(n-d)/P(n)$$

$$h_j(n+1) = h_j(n) + \alpha PX_j(n)Er_2(n-d)$$

$$h_j(n+1) = h_j(n) + \alpha \left\{ X_j(n-d) \Big/ \sum_{k=0}^{m-1} X_k(n-d)X_k(n-d) \right\} Er_2(n-d)$$

Although the processing delay d can have any value, the value of d will not differ greatly from the frame length used in noise cancellation in the noise canceler 15. The frame length is selected so that during the duration of one frame, the characteristics of the local background noise are unlikely to change significantly. During a frame of this length, the characteristics of the echo path from the loudspeaker 3 to the microphone 4 are also unlikely to change significantly, so the delay d in the values $X_j(n-d)$ and $Er_2(n-d)$ used in adjusting the tap coefficients does not prevent the adaptive filter 8 from creating an accurate echo replica E'(n).

Figure 3:
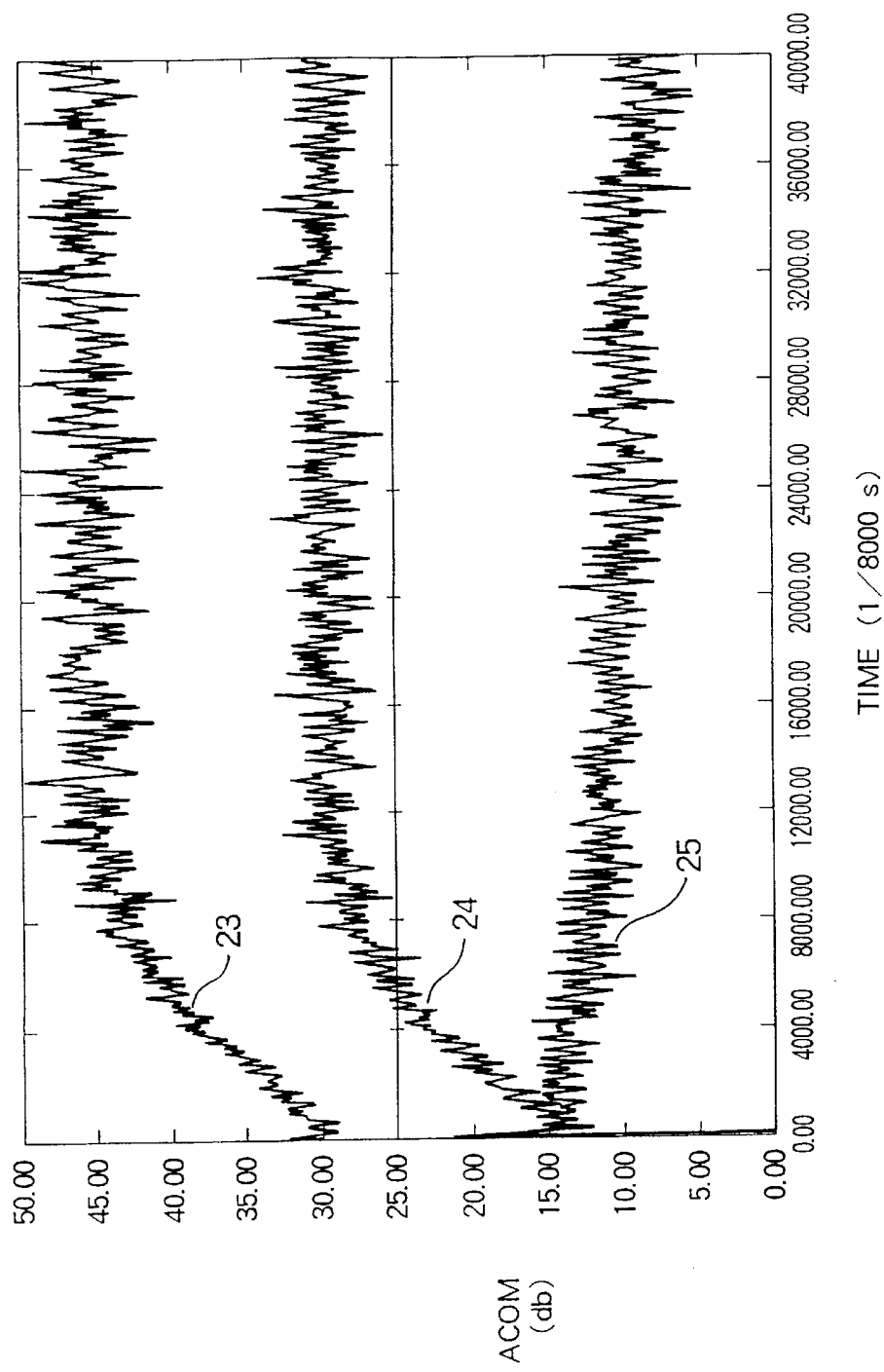
FIG. 3 is a graph showing the results of computer simulations of echo reduction.

The inventors have tested the effect of the first embodiment by computer simulation, obtaining the results shown in FIG. 3. The horizontal axis represents discrete time in units of one sample, or one eight-thousandth of a second. The vertical axis represents the echo muting factor ACOM in decibels. The received signal X was a Gaussian noise signal or white-noise signal. The intrinsic attenuation of the echo path from the loudspeaker 3 to the microphone 4 was set at fifteen decibels (15 dB). The sound of a running automobile engine was used as the local background noise N. The echo-to-noise power ratio at the microphone 4 was set at fifteen decibels. Noise cancellation was performed by spectral subtraction with a frame length of two hundred fifty-six samples, reducing the local background noise power by fifteen decibels.

The NLMS algorithm is known to reduce echo to the level of local background noise present in the residual signal employed in the adjustment of the tap coefficients. Under the simulation conditions, since the echo-to-noise ratio was fifteen decibels at the microphone 4 and the noise canceler 15 reduced the noise level by a further fifteen decibels, the echo canceler 6 was expected to attenuate the echo by thirty decibels. The expected value of ACOM was this thirty decibels, plus the intrinsic fifteen-decibel attenuation of the echo path, or forty-five decibels. As the tap coefficients converged, this expected result was indeed obtained, as shown by the upper curve 23.

The accuracy of the simulation was tested in a second run with the noise canceler 15 disabled. The expected value of ACOM was now only thirty decibels, because the tap coefficients were being adjusted on the basis of a residual signal in which the local background noise level was fifteen decibels higher than before. This result was also confirmed, as shown by the middle curve 24.

As a test of the prior art, a third simulation was run with the noise canceler 15 enabled, but without making use of the delayed sample register 12. The power calculator 20 and divider 21 were provided with the sample values $X_0(n)$ to $X_{m-1}(n)$ held in the sample register 13, instead of the sample values $X_d(n)$ to $X_{m-d-1}(n)$ output by the delayed sample register 12. The value of ACOM was found to drift downward from the initial fifteen-decibel attenuation provided by the echo path, as shown by the bottom curve 25. The echo canceler was not only failing to cancel the echo, but was generating unwanted noise of its own.

The conclusion that can be drawn from FIG. 3 is that when a substantial processing delay d is present, the first embodiment enables the tap coefficients to converge correctly, while the prior art does not permit the tap coefficients to converge at all.

Next, a second embodiment of the invention will be described.

Figure 4:
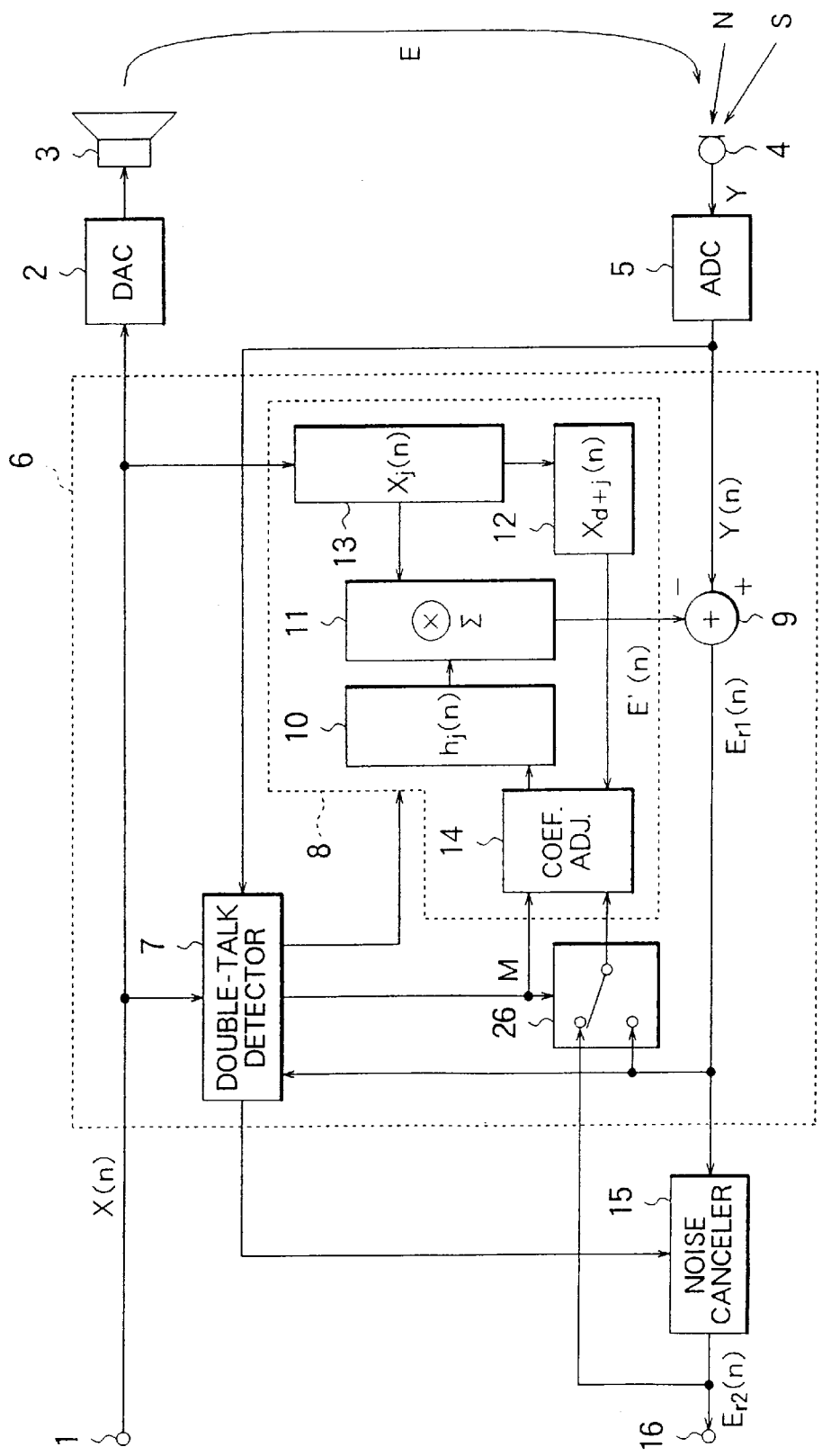
FIG. 4 is a block diagram of a first embodiment of the invention.

FIG. 4 shows the second embodiment, using the same reference numerals as in FIG. 1 for identical or equivalent elements. The new element in the second embodiment is a single-pole double-throw switch 26 that selects either the first residual signal $Er_1(n)$ or the second residual signal $Er_2(n)$ for input to the coefficient adjuster 14 in the adaptive filter 8. The selection is made in response to a mode signal M from the double-talk detector 7. The mode of operation in which the switch 26 selects the second residual signal $Er_2(n)$ will be referred to below as the first mode. The mode of operation in which the switch 26 selects the first residual signal $Er_1(n)$ will be referred to as the second mode.

Figure 5:
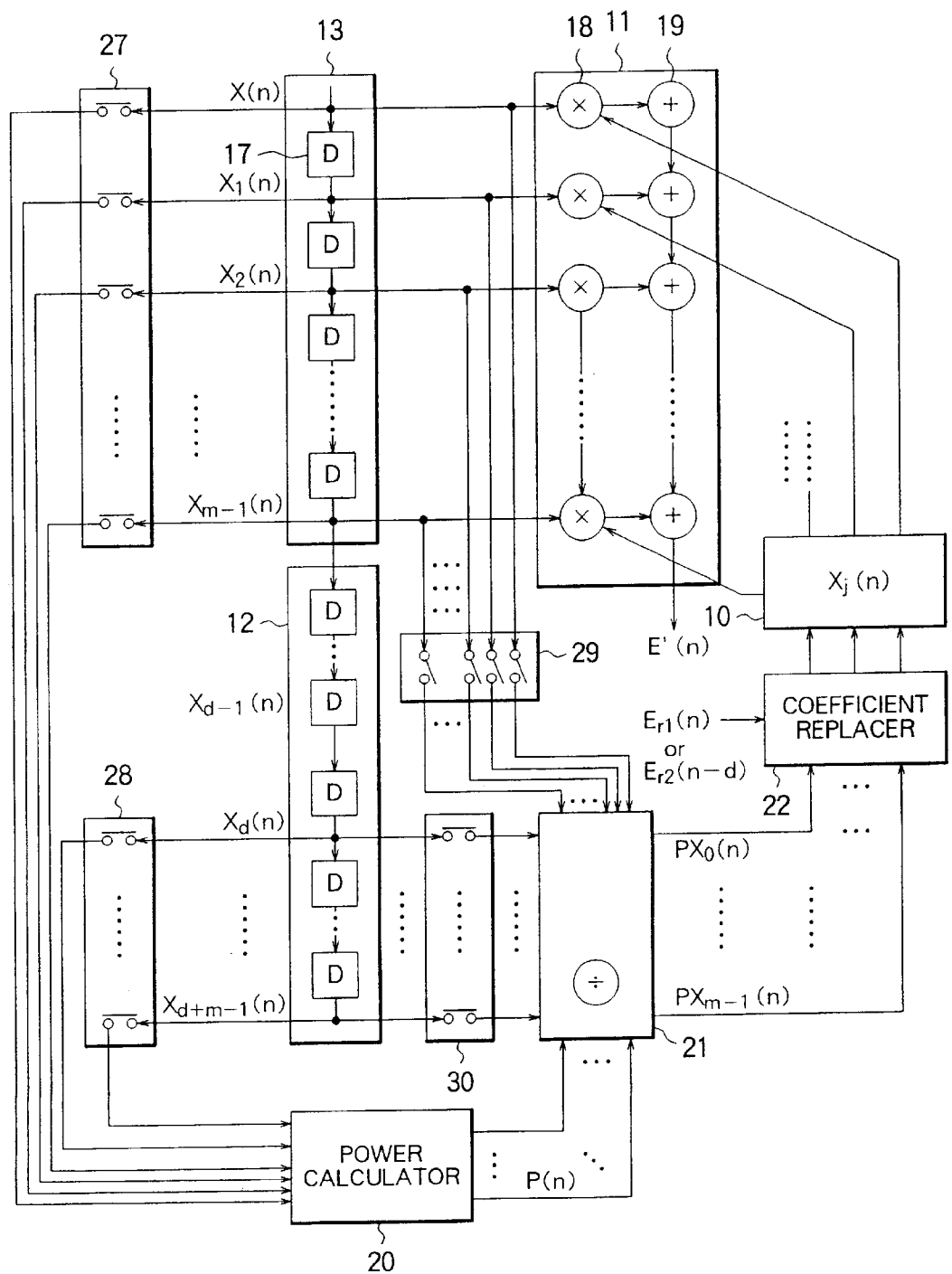
FIG. 5 is a more detailed block diagram of the adaptive filter in FIG. 4.

FIG. 5 shows the detailed structure of the adaptive filter 8 in the second embodiment, using the same reference numerals as in FIG. 2 for identical elements. The coefficient adjuster 14 has, in addition to the elements shown in FIG. 2, four m-pole single-throw switches 27, 28, 29, and 30. In their closed states, switch 27 couples the outputs of the sample register 13 to the power calculator 20, switch 28 couples the outputs of the delayed sample register 12 to the power calculator 20, switch 29 couples the outputs of the sample register 13 to the divider 21, and switch 30 couples the outputs of the delayed sample register 12 to the divider 21. In the first mode of operation, switches 27 and 29 are open and switches 28 and 30 are closed. In the second mode of operation, switches 27 and 29 are closed and switches 28 and 30 are open.

Next, the operation of the second embodiment will be described, starting with a description of the way in which the double-talk detector 7 decides between the first and second modes.

Initially, the double-talk detector 7 selects the first mode. During operation in either the first or second mode, the double-talk detector 7 calculates the ratio of the power of the received signal X(n) to the power of the first residual signal $Er_1(n)$, and compares this ratio with a predetermined threshold TH1, such as forty-five decibels (45 dB). If this ratio exceeds the threshold TH1, the double-talk detector 7 switches to the second mode. When the ratio falls below the threshold TH1, the double-talk detector 7 switches back to the first mode.

In the first mode, the coefficient adjuster 14 receives the second residual signal $Er_2(n)$ from switch 26, and the power calculator 20 and divider 21 receive sample values $X_d(n)$ to $X_{d+m-1}(n)$ from switches 28 and 30. The second embodiment accordingly operates in the same way as the first embodiment, maintaining consistency on the time axis by taking the processing delay d into account.

In the second mode, the power calculator 20 calculates the power P(n) of the received signal from the m most recent sample values $X_j(m)$, where j varies from zero to m−1, these values being obtained from switch 27.

$$P(n) = \sum_{j=0}^{m-1} X_j(n) X_j(n)$$

The divider 21 divides these m most recent sample values, obtained from switch 29, by P(n) to obtain normalized values $PX_j(n)$, where j varies from zero to m−1.

$PX_j(n) = X_j(n)/P(n)$

The coefficient replacer 22 adjusts the tap coefficients $h_j(n)$ by the NLMS algorithm, using the first residual signal $Er_1(n)$ instead of the second residual signal $Er_2(n-d)$. Again, j varies from zero to m−1.

$h_j(n+1) = h_j(n) + \alpha PX_j(n) Er_1(n)$

Because the $X_j(n)$, where j varies from zero to m−1, are the values that figured in the computation of $Er_1(n)$, the operation in the second mode is also consistent on the time axis.

As noise has not yet been canceled in the first residual signal $Er_1(n)$, a high value of the power ratio of X(n) to $Er_1(n)$ indicates a relatively low level of local background noise. In the second mode, in which this ratio exceeds the threshold TH1, the level of local background noise is considered to be so low as not to require noise cancellation. Accordingly, the double-talk detector 7 switches off the noise canceler 15 in the second mode, making the second residual signal equal to the first residual signal $Er_1(n)$.

Other aspects of operation in the second mode are the same as in the first mode.

In the first mode, by compensating for the processing delay of the noise canceler 15, the second embodiment provides the same effects as the first embodiment.

In the second mode, the second embodiment operates as if the noise canceler 15 were not present. Turning off the noise canceler 15 in the second mode saves power. In a portable telephone set, the talk time is extended.

The present invention is not limited to the embodiments described above. For example, the noise canceler 15 does not have to employ frame-based processing. The invention is applicable with any type of noise canceler in which a processing delay occurs.

The adaptive filter 8 does not have to employ the NLMS algorithm for adjustment of the tap coefficients. Any algorithm that permits the tap coefficients to be adjusted on the basis of the received signal X(n) and the output of the noise canceler 15 can be employed.

The delayed sample register 12 and sample register 13 do not have to be configured as a continuous series of D-type flip-flops. The delayed sample register 12 and sample register 13 can be configured separately, for example.

If the delay d is shorter than the time over which significant changes in the power of the received signal X(n) occur, then in the first embodiment, and in the first mode of operation of the second embodiment, the power P(n) of the received signal can be calculated from the most recent m samples, instead of using the delayed sample values output by the delayed sample register 12.

In the first embodiment, the double-talk detector 7 can use the second residual signal $Er_2(n)$ instead of the first residual signal $Er_1(n)$ to compute the power ratio ACOM. Alternatively, instead of a power ratio, the double-talk detector 7 can compute a power difference, or an amplitude level ratio, or an amplitude level difference, or perform any other computations by which the single-talk, double-talk, and other relevant states can be recognized.

In the second embodiment, the double-talk detector 7 can determine when to switch from the first mode to the second mode by calculating the power ratio of the received signal X(n) to the second residual signal $Er_2(n)$. Alternatively, the double-talk detector 7 can decide when to switch modes by comparing the power level of the first residual signal $Er_1(n)$ directly with a threshold, without calculating a power ratio.

Those skilled in the art will recognize that further variations are possible within the scope claimed below.

What is claimed is:

1. A method of adjusting coefficients in an echo/noise canceler that receives a received signal and a local input signal, uses said coefficients and a plurality of recent samples of said received signal to generate an echo replica, subtracts the echo replica from the local input signal to create a first residual signal, and cancels local background noise from the first residual signal to create a second residual signal, producing a certain processing delay between the first residual signal and the second residual signal, comprising the steps of:

storing a plurality of older sample values of said received signal, said older sample values being delayed with respect to said recent sample values by an amount corresponding to said processing delay; and adjusting said coefficients according to said older sample values and said second residual signal.

2. The method of claim 1, wherein said step of storing comprises shifting said received signal through a shift register, said recent sample values and said older sample values both being obtained as outputs of said shift register.

3. The method of claim 1, further comprising the steps of:
   detecting a level of said local background noise; and
   adjusting said coefficients according to said recent sample values and said first residual signal when the level of said local background noise is below a certain threshold.

4. The method of claim 3, further comprising the step of ceasing to cancel said local background noise from said first residual signal when the level of said local background noise is below said threshold.

5. An echo/noise canceler having an echo canceler and a noise canceler, the echo canceler receiving a received signal and a local input signal, generating an echo replica from the received signal, and subtracting the echo replica from the local input signal to create a first residual signal, the noise canceler removing local background noise from the first residual signal to create a second residual signal, and the noise canceler also producing a certain processing delay between the first residual signal and the second residual signal, the echo canceler having an adaptive filter comprising:

a sample register for storing a plurality of recent sample values of said received signal;

a coefficient register for storing a plurality of coefficients;

an arithmetic circuit coupled to said coefficient register and said sample register, for generating said echo replica from said recent sample values and said coefficients;

a delayed sample register for storing a plurality of older sample values of said received signal, said older sample values being delayed with respect to said recent sample values by an amount corresponding to said processing delay; and a coefficient adjuster coupled to said coefficient register, said delayed sample register, and said noise canceler, operating in at least a first mode, in which said coefficient adjuster adjusts said coefficients according to said older sample values and said second residual signal.

6. The echo/noise canceler of claim 5, wherein said delayed sample register and said sample register together form a single shift register through which said received signal is shifted.

7. The echo/noise canceler of claim 5, further comprising:

a detector that detects a level of said local background noise, and generates a mode signal indicating whether said level is high or low; and a switch coupled to said detector, for selecting said first residual signal when said level is low, selecting said second residual signal when said level is high, and supplying the selected residual signal to said coefficient adjuster; wherein when said mode signal indicates that the level of said local background noise is low, said coefficient adjuster operates in a second mode, in which said coefficient adjuster adjusts said coefficients according to said recent sample values and said first residual signal.

8. The echo/noise canceler of claim 7, wherein said detector switches off said noise canceler when the level of said local background noise is low.

* * * * *